United States Patent [19]

Nakano et al.

[11] Patent Number: 5,273,810
[45] Date of Patent: Dec. 28, 1993

[54] POLYBUTYLENE TEREPHTHALATE MOLDING COMPOSITION AND MOLDED THIN-WALLED ARTICLES THEREFROM

[75] Inventors: Michio Nakano; Osamu Kanoto; Kazuya Goshima; Nobuyuki Matsunaga, all of Shizuoka, Japan

[73] Assignee: Polyplastics Co., Ltd., Osaka, Japan

[21] Appl. No.: 792,521

[22] Filed: Nov. 15, 1991

[30] Foreign Application Priority Data

Nov. 19, 1990 [JP] Japan .................................. 2-315486

[51] Int. Cl.$^5$ ......................... B32B 5/16; B32B 27/06
[52] U.S. Cl. .................................... 428/215; 428/327; 428/331; 428/330; 428/480; 428/522; 428/419; 428/473.5; 428/421; 428/474.4; 524/115; 264/328.1; 264/DIG. 53; 242/118
[58] Field of Search ............... 428/522, 215, 331, 480, 428/327; 524/115

[56] References Cited

U.S. PATENT DOCUMENTS 3,953,394  4/1976  Fox et al. ........................... 524/115
4,393,106  7/1983  Maruhashi et al. ................ 428/36.7

OTHER PUBLICATIONS

Grant & Hackh's Chemical Dictionary, pp. 1 and 2.

*Primary Examiner*—P. C. Sluby
*Attorney, Agent, or Firm*—Nixon & Vanderhye

[57] ABSTRACT

Thin-walled molded articles (i.e., molded articles where at least 70% of the wall thickness is 0.8 mm or less) are formed of a polybutylene terephthalate (PBT) molding composition having improved fluidity characteristics and desirable mechanical strength properties. The PBT molding composition includes (A) 100 parts by weight of a polybutylene terephthalate base resin having a melt index of between 40 and 200 as measured at 235° C. under a load of 2160 grams according to ASTM D-1238; (B) between 1 to 60 parts by weight of plate-like glass flakes having an average flake dimension of between 10 to 200 μm; and (C) between 0.01 to 5 parts by weight of a fatty acid metal salt.

12 Claims, No Drawings

POLYBUTYLENE TEREPHTHALATE MOLDING COMPOSITION AND MOLDED THIN-WALLED ARTICLES THEREFROM

FIELD OF INVENTION

The present invention generally relates to polybutylene terephthalate molding compositions and to molded articles formed of the same. More specifically, the present invention relates to polybutylene terephthalate molding compositions which are especially adapted for use in molding thin-walled (i.e., having a wall thickness of 0.8 mm or less) articles due to its superior melt-flow characteristics and mechanical properties.

BACKGROUND AND SUMMARY OF THE INVENTION

Polybutylene terephthalate (PBT) resins are a well known class of thermoplastic engineering resins and are used extensively to form a variety of molded articles due to its favorable mechanical, electrical and chemical properties, as well as its relative ease of processability. Although PBT resins may be use alone to form molded articles, it is typically blended with one or more additive components so as to tailor the properties of the resulting blended PBT composition to a particular end-use application. For example, fibrous reinforcement agents are typically blended with PBT base resins to form reinforced molded PBT articles. These "filled" PBT resin molded articles (i.e., containing reinforcement agents) are thereby intended to be employed in end-use applications which require greater mechanical strength and rigidity characteristics than can be attained by the use of "unfilled" PBT base resins alone.

PBT compositions which are filled with such fibrous reinforcing agents typically exhibit a relatively high degree of mechanical strength and rigidity as compared to unfilled PBT resins which is apparently due to the formation of anisotropic regions during molding. However, the inclusion of fibrous reinforcing agents is problematic in that increased warpage of molded products—especially relatively thin planar products or box-shaped products having relatively thin wall sections—is to be expected.

Several techniques have been proposed to minimize the warping propensity of molded articles made from PBT resin compositions which are filled with reinforcing agents. For example, it has been suggested that PBT compositions containing spherical reinforcing agents (e.g., in the form of glass beads) or plate-like reinforcing agents (e.g., in the form of mica) may be used to reduce the expected warpage of molded articles. These suggested proposals typically do result in some molded articles having a considerably lesser amount of warpage. However, problems still exist when PBT compositions are employed to form molded articles having relatively thin walls.

For example, in the case of relatively thin planar articles (such as floppy discs) and box-shaped articles having relatively thin walls (such as thin-walled electrical connectors, microswitches, miniature coil bobbins, computer keyboard frames and the like), mold defects typically occur due to inadequate melt-flow properties of PBT compositions filled with reinforcing agents. This inadequate melt-flow property of reinforcement-filled PBT resin compositions thus results in nonuniform flow of the molten resin within the mold cavity with the usual result that the mold cavity is inadequately filled. As a consequence, therefore, thin-walled articles molded from reinforcement-filled PBT resin compositions may have nonuniform regions which are more susceptible to warpage.

Thus, a need exists in this art for PBT resin compositions which are filled with a reinforcing agent to have improved melt-flow characteristics which would be better suited for use in forming thin-walled molded articles. It is towards fulfilling this need that the present invention is directed.

According to the present invention, filled PBT resin compositions are provided which exhibit superior melt-flow properties so as to be useful for forming thin-walled molded articles. The resulting thin-walled molded articles have desirable mechanical properties and an extremely low degree of warpage. The present invention thus offers thin-walled molded articles made of PBT resin which have a low degree of warpage.

The present invention more specifically relates to PBT resin compositions and thin-walled molded articles formed thereof which include a PBT base resin having a specifically defined viscosity, plate-like glass flakes having a specifically defined flake dimension, and a metal salt of a fatty acid.

Further aspects and advantages of the present invention will become more apparent after careful consideration is given to the detailed description of the preferred exemplary embodiments thereof which follow.

DETAILED DESCRIPTION OF THE PREFERRED EXEMPLARY EMBODIMENTS

The preferred PBT compositions of this invention will be a melt-blend of the following necessary components:

(A) a polybutylene terephthalate base resin having a melt index of between 40 to 200 as measured at 235° C. under a load of 2160 grams according to ASTM D-1238;

(B) between 1 to 60 parts, per 100 parts by weight of the polybutylene terephthalate base resin, by weight of plate-like glass flakes having an average flake dimension of between 10 to 200 micrometers ($\mu$m); and (C) between 0.01 to 5 parts, per 100 parts by weight of the polybutylene terephthalate base resin, by weight of a fatty acid metal salt.

The PBT base resin that is employed in the compositions of this invention may be a homopolyester or copolyester comprised mainly of repeating butylene terephthalate units. For example, the PBT base resin may be a copolyester that is obtained by condensation of 1,4-butanediol and terephthalic acid or its lower alcohol ester.

The present invention necessarily requires the use of a polybutylene terephthalate base resin having a melt index of between 40-200 and preferably between 60-150, as measured at a temperature of 235° C. and under a load of 2160 grams according to ASTM D-1238. Use of PBT base resins having a melt index of less than 40 results in poor melt fluidity and is inferior in terms of molding and warp deformation. On the contrary, PBT base resins having a melt index in excess of 200 exhibit good melt fluidity but results in molded products having inadequate strength properties.

The plate-like glass flakes that are used in the compositions of the present invention are those having a thickness of between 0.1 to 10 micrometers and an average flake dimension of between 10-200 micrometers, and preferably between 10-100 micrometers. By the term "average flake dimension" is meant the average of the diameter and/or length dimensions of the glass flakes employed. When the average flake dimension is less than 10 micrometers, there is virtually no improvement in terms of minimizing the warp deformation of molded articles. On the other hand, glass flakes having an average flake dimension in excess of 200 micrometers results in a high degree of injection pressure during molding due to a decrease in the fluidity of the composition. As a result, an undesirable increase in the warp deformation of the molded article occurs.

Although these plate-like glass flakes can be melt-blended with the PBT base resin as is, it is preferred to use glass flakes which have been surface-treated with a silane-based, titanate-based or epoxy-based coupling agent in order to improve the affinity and adhesion of the glass flakes to the PBT base resin.

The glass flakes are present in the compositions of this invention in an amount between 1 to 60 parts by weight, and preferably between 1 to 40 parts by weight, per 100 parts by weight of the polybutylene terephthalate base resin. When the amount of glass flakes is less than 1 part by weight, a minimal decrease in the warp deformation of molded articles ensues. On the other hand, when the amount of the glass flakes is in excess of 60 parts by weight, the melt-fluidity of the composition during molding is reduced resulting in an inadequate mold filling.

The compositions of this invention also necessarily include a fatty acid metal salt. The fatty acid metal salt not only increases the melt-fluidity of the PBT base resin, but is also synergistically effective in terms of further improvements in the deformation and warp resistance properties attributable to the plate-like glass flakes.

The fatty acid metal salt which is used in the compositions of this invention is most preferably a metal salt of a fatty acid having 12 to 32 carbon atoms. Examples of such fatty acids include fatty acids such as caproic acid, caprylic acid, undecylic acid, lauric acid, tridecylic acid, myristic acid, palmitic acid, stearic acid, behenic acid, lignolinic acid, cerotic acid, montanic acid and melissic acid, or unsaturated fatty acids such as oleic acid, elaidic acid, linoleic acid, arachidonic acid, brassidic acid, erucic acid and recinoleic acid. In addition, examples of metal salts include the salts of calcium, magnesium, zinc, sodium and aluminum. Especially preferred are the metal salts of fatty acids selected from palmitic acid, stearic acid or behenic acid, and more preferably, at least one selected from zinc palmitate, zinc stearate or sodium stearate.

The fatty acid metal salt component is present in the compositions of this invention in an amount between 0.01 to 5 parts by weight, and preferably between 0.1 to 2 parts by weight, per 100 parts by weight of the PBT base resin. If an insufficient amount of the fatty acid metal salt is present, then very little melt-fluidity improvement and virtually no improvement in warp resistance is obtained. If the amount of the fatty acid metal salt is too large, however, there is a decrease in mechanical properties of the composition, in addition to increasing the propensity of the fatty acid metal salt to undesirably "bleed" from the molded article.

The compositions of the present invention may optionally contain minor amounts of other thermoplastic resins provided that the properties achieved by the addition of the glass flakes and fatty acid metal salt components as described above are not deleteriously affected. In this connection, virtually any thermoplastic resin which is stable at high temperatures may be used as an optional component. Specific examples of such optional thermoplastic resins include polyamides, acrylonitrilebutadiene-styrene resins, polyphenylene oxides, polyalkylacrylates, polyacetals, polysulfones, polyether sulfones, polyether imides, polyether ketones and fluororesins. These optional thermoplastic resins may be used either alone, or in combinations of two or more of the same.

Other additives which are known in the art and which are conventionally incorporated into thermoplastic engineering resins may be employed in the compositions of this invention. Specific examples of such additives include stabilizers, such as anti-oxidants, thermal stabilizers and UV-light absorbing agents, antistatic agents, flame retardants, lubricants, nucleating agents, dyes and pigments, mold-release agents, and the like. Furthermore, inorganic filler materials (i.e., other than the glass flakes described previously) may also be incorporated into the compositions of this invention in order to obtain desired property enhancements.

Any conventional processing technique may be employed to form the compositions of this invention. For example, the PBT base resin, glass flakes and fatty acid metal salt as described above, may be directly charged into an extruder and then melt-kneaded to form pellets. The pellets may then be used to injection mold thin-walled articles. Alternatively, pellets having different compositions may fist be prepared, with the pellets being thereafter mixed in desired proportions and supplied to a molding machine. Furthermore, the additive components may be mixed separately and then melt-blended with the PBT base resin in an extruder to form pellets that can subsequently be used in molding operations. Finally, the additives may be pulverized into fine particles and then mixed prior to melt-blending so as to improve the homogeneity of the resulting melt-blended composition.

The compositions of the present invention can be used to form virtually and thin-walled article. As used herein, the term "thin-walled" is intended to refer to articles with at least 70% of their wall thickness being 0.8mm or less. Specific examples of thin-walled articles that may be formed using the compositions of this invention include components for thin-walled connectors, microswitch cases, miniature coil bobbins, computer keyboard frames and floppy discs.

If less than 70% of the article's wall thickness is 0.8 mm or less, or if the wall thickness of the article is greater than 0.8mm, the use of the compositions of the present invention should not be used since its increased melt-fluidity can be detrimental in forming such articles having relatively "thick" walls. That is, for relatively thick-walled articles, the enhanced melt-fluidity of the compositions of the present invention may cause problems during molding by flowing into tiny gaps in the mold. As a result, burrs are formed on the molded article. While the formation of such burrs may be minimized (if not eliminated) by altering the conditions under which the article is molded, problems in terms of warpage and deformation of the molded article could result. Thus, the compositions of this invention are especially well suited for molding only thin-walled articles as described above.

Further aspects and advantages of the present invention will become more clear after careful consideration is given to the following nonlimiting Examples.

EXAMPLES

The following measurement techniques were used to obtain the data in the Examples:

(1) Fluidity Measurement (Bar Flow Length)

Pellets composed of the components listed in Table 1 were used to form molded thin-walled testpieces (width: 5 mm; thickness: 0.3 mm) using a molding machine set to the conditions indicated below. Fluidity was then evaluated based on the length of the melt flow (length of resin filling the mold).

| | |
|---|---|
| Cylinder temperature: | 270° C. |
| Injection pressure: | 900 kg/cm$^2$ |
| Mold temperature: | 60° C. |

(2) Deformation Measurement

Pellets composed of the components listed in Table 1 were used to form molded square flat testpieces having one pin gate in the center and measuring 50 mm on a side (thickness: 0.7 mm) using a molding machine set to the conditions indicated below. That portion of the testpiece having maximum deformation with the testpiece lying on a flat table surface (i.e. the location where the gap between the table surface and the testpiece was the greatest) was measured as the amount of deformation.

| | |
|---|---|
| Cylinder temperature: | 260° C. |
| Injection pressure: | 650 kg/cm$^2$ |
| Mold temperature: | 60° C. |

(3) Measurement of Physical Properties

Izod impact strength and melt index (MI) in compliance with ASTM D-256 were measured at a temperature of 235° C. and under a load of 2160 grams according to ASTM D-1238.

EMBODIMENTS 1-7 AND COMPARATIVE EXAMPLES 1-8

Using polybutylene terephthalate having a melt index of 70 for the polybutylene terephthalate base resin (A), the plate-like glass flakes (B) and fatty acid metal salts (C) identified in Table 1 were added and blended in the proportions indicated in Table 1. Pellet-shaped resin components for molding were then obtained with a 30 mmΦ double shaft extruding machine. The various testpieces were then made by an injection molding machine using these pellets and were evaluated in the manner described above. For comparison purposes, pellets were also made in the same manner as in the above embodiments in which component (B) or component (C) were omitted, as well as using components in which plate-like glass flakes outside the scope of the present invention, talc or mica were used for component (B). These comparative examples were then evaluated in the same manner.

The results for both the embodiments and comparative examples are provided in Table 1.

EMBODIMENT 8 AND COMPARATIVE EXAMPLE 9

With the exception of changing component (A) of Embodiment 2 to a polybutylene terephthalate having a melt index of 120, testing and evaluation were performed in the same manner as Embodiment 2, with the results being indicated in Table 1. On the other hand, a comparative example wherein component (C) was omitted was tested and evaluated in the same manner as Embodiment 8. Those results are also indicated in Table 1.

TABLE 1

| | | Units | Embodiments | | | | | | | | Comparative Examples | | | | | | | | |
|---|---|---|---|---|---|---|---|---|---|---|---|---|---|---|---|---|---|---|---|
| | | | 1 | 2 | 3 | 4 | 5 | 6 | 7 | 8 | 1 | 2 | 3 | 4 | 5 | 6 | 7 | 8 | 9 |
| COMPOSITION | | | | | | | | | | | | | | | | | | | |
| A*$^1$ | | | | | | | | | | | | | | | | | | | |
| Polybutylene Terephthalate | A-1 | Parts by weight | 100 | 100 | 100 | 100 | 100 | 100 | 100 | | 100 | 100 | 100 | 100 | 100 | 100 | 100 | 100 | |
| | A-2 | | | | | | | | | 100 | | | | | | | | | 100 |
| B*$^2$ | | | | | | | | | | | | | | | | | | | |
| Plate glass flakes or talc or mica | B-1 | Parts by weight | 5 | 10 | 30 | 10 | | | | 10 | 5 | | 10 | | 30 | | | | 10 |
| | B-2 | | | | | | 10 | 10 | 10 | | | | | | | | | | |
| | B'-1 | | | | | | | | | | | | | 10 | | | | | | |
| | B'-2 | | | | | | | | | | | | | | | | 5 | | | |
| | B'-3 | | | | | | | | | | | | | | | | | 5 | | |
| C*$^3$ | | | | | | | | | | | | | | | | | | | |
| Fatty acid metal salt | C-1 | Parts by weight | 0.3 | 0.3 | 0.3 | 1.0 | 0.3 | | | 0.3 | 0.3 | | 0.3 | | 0.3 | | | 0.3 | 0.3 |
| | C-2 | | | | | | | 0.3 | | | | | | | | | | | | |
| | C-3 | | | | | | | | 0.3 | | | | | | | | | | | |
| Physical Properties | | | | | | | | | | | | | | | | | | | |
| Fluidity | | mm | 30 | 27 | 22 | 35 | 25 | 28 | 24 | 36 | 22 | 33 | 17 | 27 | 12 | 20 | 23 | 22 | 20 |
| Amt. of Deformation | | mm | 0.6 | 0.4 | 0.6 | 0.5 | 0.5 | 0.6 | 0.4 | 0.4 | 1.2 | 1.3 | 1.0 | 1.1 | 0.8 | 1.1 | 1.4 | 1.3 | 0.9 |
| Izod Impact | | kg* | 2.9 | 3.2 | 3.5 | 2.7 | 3.2 | 3.0 | 3.0 | 2.3 | 3.0 | 1.7 | 2.7 | 3.2 | 3.4 | 1.6 | 1.2 | 0.7 | 1.6 |

TABLE 1-continued

| | Units | Embodiments | | | | | | | | Comparative Examples | | | | | | | | |
|---|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 | 9 |
| Strength | cm/cm | | | | | | | | | | | | | | | | | |

Notes to Table 1:
*1 A-1: Melt index 70
A-2: Melt index 120
*2 B-1: Average flake dimension: 50 micrometers
B-2: Average flake dimension: 100 micrometers
B'-1: Average flake dimension: 300 micrometers
B'-2: Talc average flake dimension: 30 micrometers
B'-3: Mica average flake dimension: 30 micrometers
*3 C-1: Zinc stearate
C-2: Sodium stearate
C-3: Zinc palmitate While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polybutylene terephthalate molding composition comprising:
    (a) a polybutylene terephthalate base resin having a melt index of between 40 to 200 as measured at 235° C. under a load of 2160 grams according to ASTM D-1238;
    (B) between 1 to 60 parts by weight, per 100 parts by weight of said polybutylene terephthalate base resin, of plate-like glass flakes having an average flake dimension of between 10 to 200 μm; and
    (C) between 0.01 to 5 parts by weight, per 100 parts by weight of said polybutylene terephthalate base resin, of a fatty acid metal salt.

2. A polybutylene terephthalate molding composition as in claim 1, wherein the melt index of the polybutylene terephthalate base resin is between 60 to 150.

3. A polybutylene terephthalate molding composition as in claim 1, wherein the average flake dimension of the plate-like glass flakes is between 10 to 100 μm.

4. A polybutylene terephthalate molding composition as in claim 1, wherein the fatty acid moiety of the fatty acid metal salt is at least one selected from palmitic acid, stearic acid and behenic acid.

5. A polybutylene terephthalate molding composition as in claim 1, wherein the metal moiety of the fatty acid metal salt is selected from zinc and sodium.

6. A thin-walled molded article having at least 70% of its wall thickness being less than 0.8 mm and being formed of the polybutylene terephthalate composition as in any one of claims 1-5.

7. A thin-walled molded article as in claim 6, in the form of a connector, a microswitch case, a miniature coil bobbin, a computer keyboard frame of a floppy disc.

8. A thin-walled molded article having at least 70% of its wall thickness being 0.8 mm or less, and consisting essentially of a polybutylene terephthalate molding composition which comprises:
    (A) a polybutylene terephthalate base resin having a melt index of between 40 to 200 as measured at 235° C. under a load of 2160 grams according to ASTM D-1238;
    (B) between 1 to 60 parts by weight, per 100 parts by weight of said polybutylene terephthalate base resin, of plate-like glass flakes having an average flake dimension of between 10 to 200 μm; and
    (C) between 0.01 to 5 parts by weight, per 100 parts by weight of said polybutylene terephthalate base resin, of a fatty acid metal salt.

9. A thin-walled molded article as in claim 8, wherein the melt index of the polybutylene terephthalate base resin is between 60 to 150.

10. A thin-walled molded article as in claim 8, wherein the average flake dimension of the plate-like glass flakes is between 10 to 100 μm.

11. A thin-walled molded article as in claim 8, wherein the fatty acid moiety of the fatty acid metal salt is at least one selected from palmitic acid, stearic acid and behenic acid.

12. A thin-walled molded article as in claim 8, wherein the metal moiety of the fatty acid metal salt is selected form zinc and sodium.

* * * * *